C. M. ORTON.
Kettle-Cover.
No. 209,707. Patented Nov. 5, 1878.
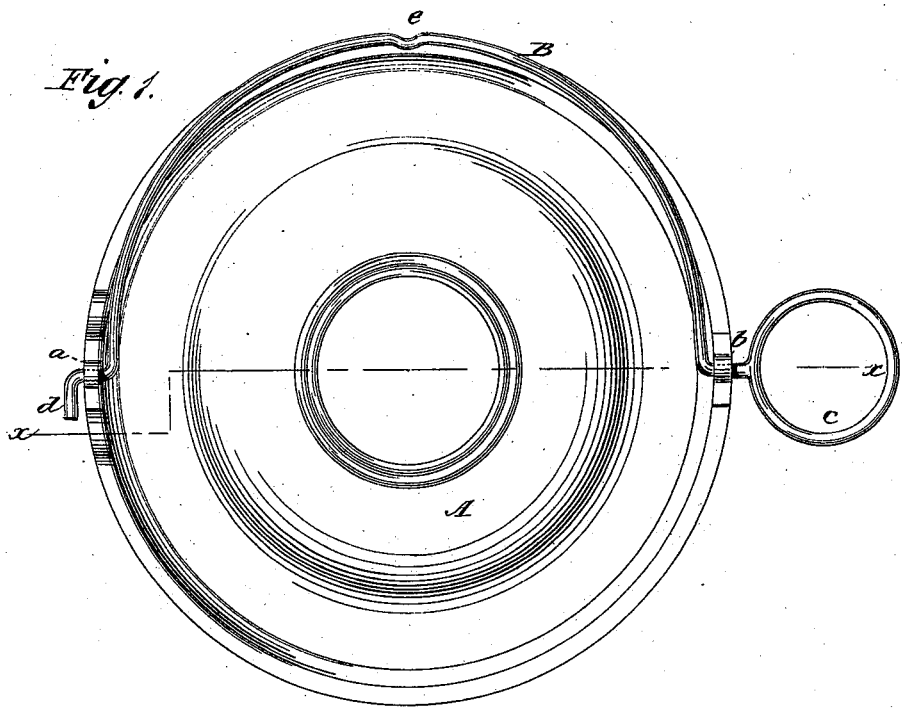
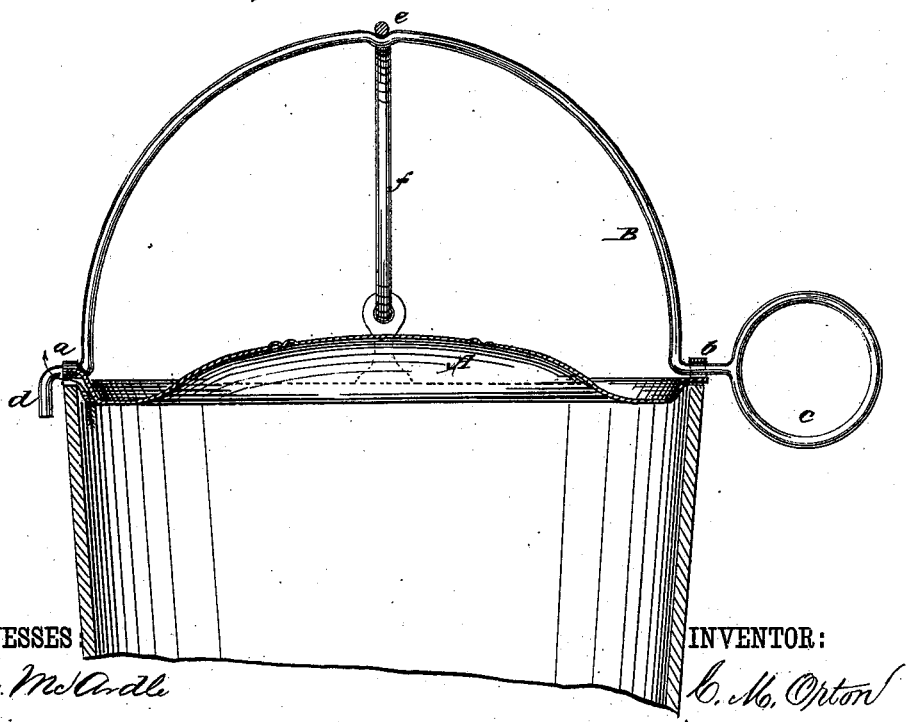
WITNESSES
Francis McArdle
C. Sedgwick
INVENTOR:
C. M. Orton
BY Munn & Co
ATTORNEYS.

UNITED STATES PATENT OFFICE.

CHAUNCEY M. ORTON, OF GLENS FALLS, NEW YORK.

IMPROVEMENT IN KETTLE-COVERS.

Specification forming part of Letters Patent No. 209,707, dated November 5, 1878; application filed April 13, 1878.

*To all whom it may concern:*

Be it known that I, CHAUNCEY M. ORTON, of Glens Falls, in the county of Warren and State of New York, have invented a new and Improved Kettle-Cover, of which the following is a specification:

Figure 1 is a plan view of my improved kettle-cover. Fig. 2 is a transverse section of the same, taken on line $xx$ in Fig. 1.

Similar letters of reference indicate corresponding parts.

The object of my invention is to provide a cover for pots and kettles which may be readily applied to the kettle, and when in place will be securely held, so as to prevent it from slipping, and will afford means for handling and tipping the kettle without danger of burning the hands, or of emptying the articles from the kettle as water is poured off.

In the drawing, A is a kettle-cover, which consists of a disk of tin or other sheet metal, stamped or spun up in the usual way, and provided with ears $a\ b$, for receiving the wire bail B. The ends of the bail project through the ears, and upon one end is formed a ring, $c$, and upon the other a hook or stop, $d$. In the middle of the bail there is a small inwardly-projecting curve, $e$, for receiving the kettle-bail $f$ when the cover is in place on the kettle. On each side of the ear $a$ the cover is swaged outwardly to form passages for the escape of water when the kettle is canted.

The ring $c$ forms a convenient handle for tipping the kettle, while the hook $d$ prevents the cover from slipping from the kettle. The engagement of the bail $f$ with the bail B secures the cover firmly to the kettle.

Having thus described my invention, what I claim as new, and desire to secure by Letters Patent, is—

The combination of the bail B, having the ring $c$ and hook $d$, with the cover A, as herein shown and described.

CHAUNCEY M. ORTON.

Witnesses:
 THOMAS MARTIN,
 HENRY WARREN.